United States Patent [19]

Deguchi

[11] Patent Number: 6,151,515
[45] Date of Patent: Nov. 21, 2000

[54] 7, 8 SEGMENT DISPLAY FOR MOBILE RADIO TELEPHONE

[75] Inventor: Kazuo Deguchi, Lawrenceville, Ga.

[73] Assignee: Mitsubishi Wireless Communications Inc., Duluth, Ga.

[21] Appl. No.: 08/305,643

[22] Filed: Sep. 14, 1994

[51] Int. Cl.[7] ............................... H04B 1/38; H04M 1/00
[52] U.S. Cl. .................... 455/566; 455/158.1; 455/158.2
[58] Field of Search ........................ 379/58, 396; 455/77, 455/158.1, 158.2, 566

[56] References Cited

U.S. PATENT DOCUMENTS

| | | | |
|---|---|---|---|
| 4,047,227 | 9/1977 | Rzeszewski | 455/158.2 |
| 4,264,979 | 4/1981 | Gutowski | 455/77 |
| 4,320,255 | 3/1982 | Null et al. | 455/158.2 |
| 4,495,651 | 1/1985 | Froeliger | 455/158.1 |
| 5,337,346 | 8/1994 | Uchikura | 379/58 |
| 5,371,788 | 12/1994 | Baals et al. | 379/396 |

OTHER PUBLICATIONS

America Online, "Bellsouth Cellular/IBM Simon", May 1994.
America Online, "Clarion CAL–1000", May 1994.
Wagenlehner, "Mobile Telephoning Made Easy", Telcom Report 10, #4, Apr. 1987.
DIGI–Key, Catalog #902, Mar. 1990.
Motorola, "User Manual", 68PO9369A99–0, Jan. 1993.
Bell Atlantic Mobile, "Bell Atlantic SEIII–M", Nov. 1993.
America Online, "Motorola 2900NX", Mar. 1995.
America Online, "Panasonic EB–H40", Mar. 1995.

*Primary Examiner*—William Cumming
*Attorney, Agent, or Firm*—Rothwell, Figg, Ernst & Manbeck

[57] ABSTRACT

A display for a mobile radio telephone apparatus includes a single 7, 8 segment LED display for displaying alphanumeric characters one at a time in sequence as dialed, and which also displays indications of various operating parameters of the telephone apparatus, such as a roaming function or in use status, by using predetermined ones of the same segments that are used to display the alphanumeric characters. In this way, a single seven segment display plus an eighth display indicator segment is all that is required to display any character, digit or indication of operational status of the mobile radio telephone apparatus.

18 Claims, 3 Drawing Sheets

7, 8 SEGMENT DISPLAY FOR MOBILE RADIO TELEPHONE

BACKGROUND OF THE INVENTION

1. Field of the Invention

This invention is generally related to mobile radio communication apparatus such as cellular telephones, and more specifically is directed to a novel display for such mobile telephone apparatus including a single 7, 8 segment LED display.

2. Background and Prior Art

Conventional mobile radio telephones are characterized by their relative complexity, large size, and high cost. FIG. 1 illustrates one conventional configuration for a mobile radio telephone apparatus according to the prior art.

The radio telephone apparatus of FIG. 1 includes a telephone body 10, a liquid crystal display (LCD) 20, a keypad 30, a speaker 40 and an antenna 50. As shown, the LCD 20 includes a plurality of segmented digit display components 20a as well as a plurality of indicator display components 20b. The digit display components 20a are used to represent alphanumeric characters such as the dialed digits of a telephone number, while the indicator display components are used to indicate the status of various operational parameters such as RSSI (Received Signal Strength Indicator), ROAM, IN USE, NO SERVICE, LOW BATTERY, and the like. As such, the LCD of the conventional mobile radio telephone apparatus is complex and expensive.

There exists a need in the art to simplify the display of a mobile radio telephone apparatus to reduce cost and complexity.

SUMMARY OF THE INVENTION

The present invention provides a novel display for a mobile radio telephone apparatus which solves the problems noted above, and achieves a reduction in complexity and cost of such telephone apparatus.

Specifically, the present invention provides a display for a mobile radio telephone apparatus, comprising a single 7, 8 segment LED display having seven segments for representation of alphanumeric characters through selective activation of various combinations of said seven segments, and an eighth segment for representation of an operational parameter of said apparatus, means for designating predetermined ones of said seven segments for representation of other operational parameters of said apparatus, and means for controlling selective activation of said 7, 8 segment LED display in response to signals from circuitry of said apparatus so as to selectively represent alphanumeric characters and operational parameters of said apparatus.

In another aspect of the invention, a method is provided for displaying information on a mobile radio telephone apparatus, comprising the steps of providing a single LED display for said telephone apparatus having seven segments for representing a single alphanumeric character, designating predetermined ones of said seven segments of said LED display as indicating specific operational parameters of said telephone apparatus, displaying individual alphanumeric characters on said display by activation of various predetermined combinations of said seven segments in a first mode of operation of said apparatus, and activating particular ones of said predetermined ones of said seven segments in a second mode of operation to indicate the status of said operational parameters.

BRIEF DESCRIPTION OF THE DRAWINGS

The present invention will become more fully understood from the detailed description hereinbelow and the accompanying drawings, which are given by way of illustration only and are not limitative of the present invention, and wherein.

DETAILED DESCRIPTION OF THE PREFERRED EMBODIMENT

Figure 1:
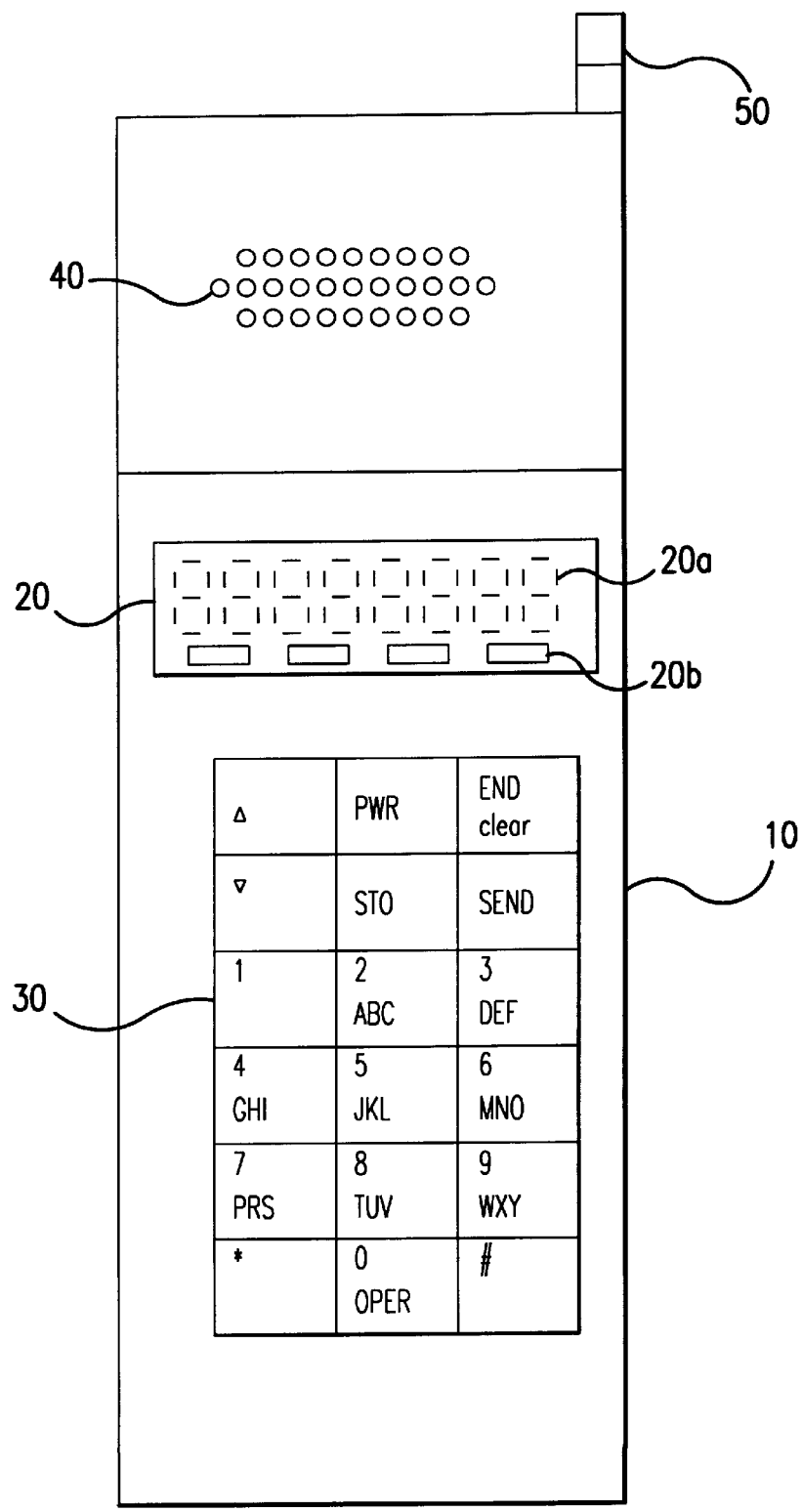
FIG. 1 is a front view of a conventional mobile radio telephone apparatus according to the prior art.
Figure 2:
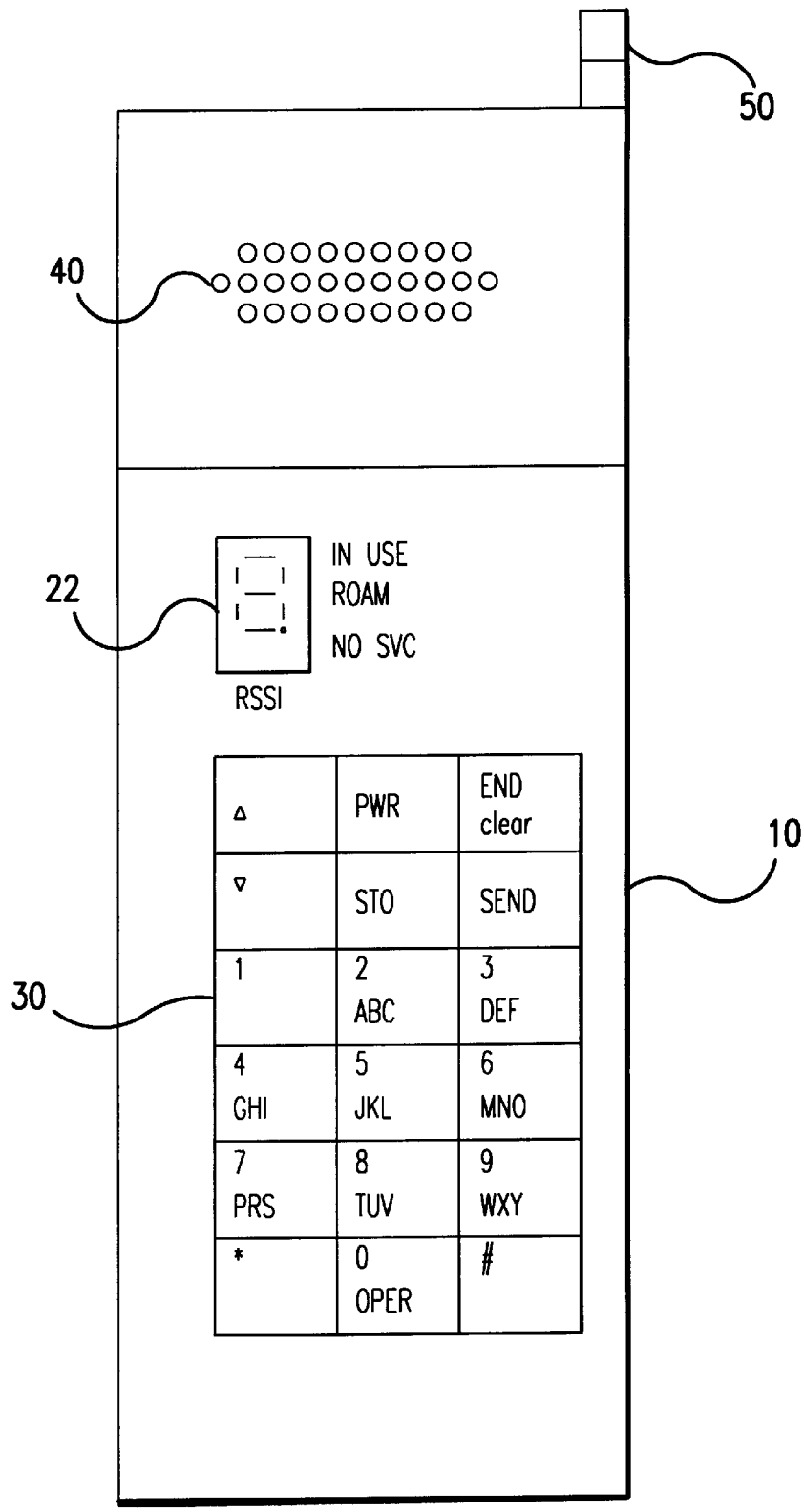
FIG. 2 is a front view of a mobile radio telephone apparatus according to a preferred embodiment of the present invention.
Figure 3:
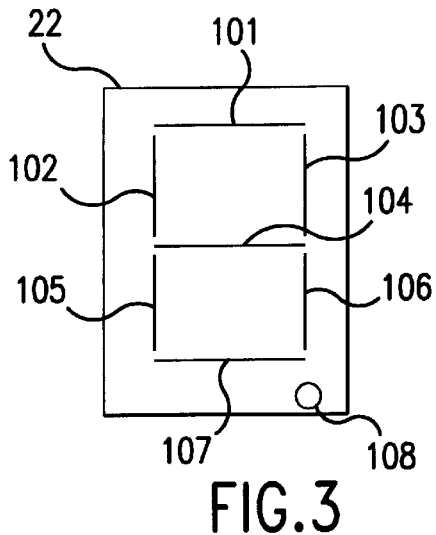
FIG. 3 is a detailed view of the novel display 22 of the apparatus of FIG. 2.

FIG. 2 shows a preferred embodiment of a mobile radio telephone apparatus in accordance with the present invention. According to the present invention, the multielement LCD display 20 is eliminated and is replaced with a single 7, 8 segment LED (light-emitting diode) display 22. As shown in FIG. 3, the 7, 8 segment LED display contains seven segments 101–107 constituting a seven-segment display for representing digits and characters, and an eighth segment 108 which indicates an operational parameter of the apparatus, such as RSSI (Received Signal Strength Indicator) in the given example.

In accordance with the present invention, the 7, 8 segment LED display 22 sequentially displays alphanumeric characters, such as digits dialed by the user representing a called telephone number, one at a time as dialed. Additionally, according to the present invention the 7, 8 segment display 22 is also used to represent various operational parameters of the mobile radio telephone apparatus.

Figure 4:
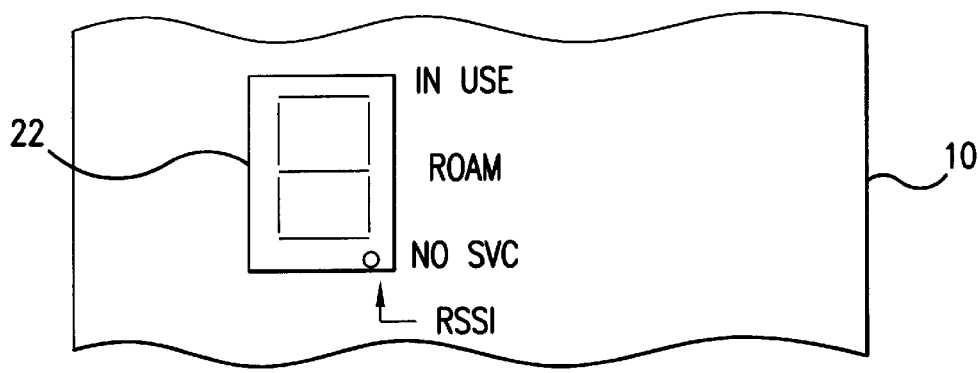
FIG. 4 is a segmented magnified view of the front of the mobile radio telephone apparatus of FIG. 2.

As shown in FIG. 4, predetermined ones of the seven segments 101–107 of the LED display are designated for representing certain operational parameters of the apparatus. For example, segment 101 is designated on the body of the telephone apparatus as representing the "IN USE" parameter. "IN USE" indicates that a call is presently in progress. Accordingly, when segment 101 is activated (such as in a flashing condition), the user will understand that the system is attempting to complete a telephone call to the dialed destination number.

Similarly, segment 104 is designated as representing the "ROAM" operational parameter. "ROAM" indicates whether the apparatus is operating on a preferred mobile telephone system other than its home system or whether the apparatus is operating on a non-preferred system. For example, the segment 104 being activated in a steady state indicates operation on a preferred system, and being activated in a flashing state indicates operation on a non-preferred system. Thus, the user may decide to abort a call that is being completed on a non-preferred system according to the indication provided by the display segment 104.

Segment 107 is designated on the telephone body 10 as representing the "NO SVC" or no service operational parameter of the apparatus. "NO SVC" indicates that the mobile radio telephone apparatus is outside of the range of a service area such as a defined cellular radio telephone service area. Thus, when segment 107 is activated, the user will understand that a call to the dialed destination number cannot be completed because the user is not within an available mobile radio telephone service region.

Display region 108 is designated according to a preferred embodiment of the invention as an RSSI indicator. The RSSI provides a numerical indication to the user of the signal strength of a received signal from such as a base station of a mobile cellular telephone system. When activated in a steady state, the segment 108 indicates to the user that the digit being displayed by the seven segments 101–107 in combination represents the strength of a received signal. The segment 108 may also be used to indicate a low battery level by being activated in a flashing state.

Figure 5:
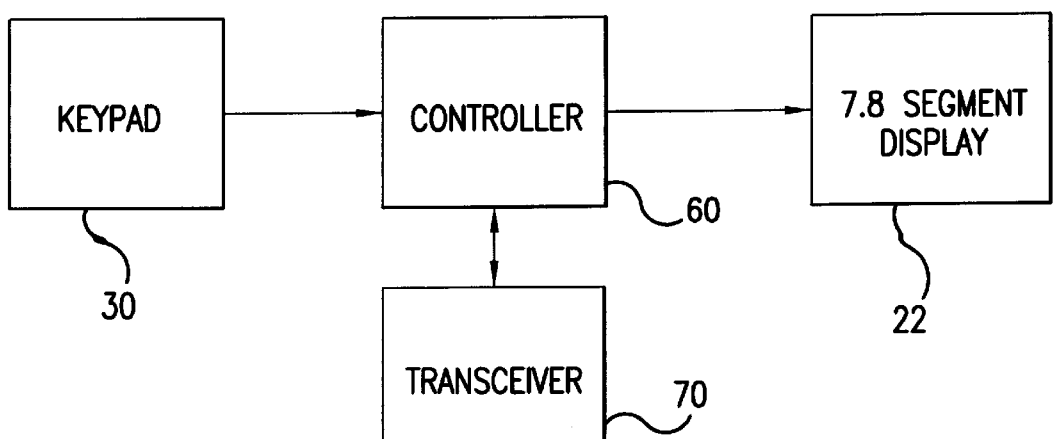
FIG. 5 is a block diagram of the major components of a mobile radio telephone apparatus according to a preferred embodiment of the present invention.

FIG. 5 shows a simplified block diagram of the components of the mobile radio telephone apparatus according to the present invention, wherein a controller 60 is provided to control operation of the apparatus as well as to control the activation of the segments of the 7, 8 segment LED display 22. Transceiver circuitry 70 is provided to send and receive electromagnetic signals via antenna 50. Depending upon the nature of the signals being sent and received by the transceiver 70, the controller 60 will cause the appropriate segments of the display 22 to be activated. In this regard, the controller 60 may include a decoding table in a ROM which maps the various operational parameter states to corresponding display segments.

In addition to the above functions, the novel 7, 8 segment display may be used to indicate other functions or states of the mobile radio telephone apparatus 10. For example, predetermined segments may be activated to flash when the apparatus is switched to a programming mode for selecting preferred systems or storing frequently dialed destination numbers. Different characters may be displayed in a flashing state which indicates action to be taken by the user such as inputting digits or pressing certain function keys. Also, the level of a low battery may be indicated by a numerical digit when the segment 108 is flashing.

According to the present invention, by defining certain of the segments of the LED display to represent operational parameters in a second mode of operation, such as dialing or roaming, while the same segments are used to represent alphanumeric characters in a first mode of operation such as inputting digits by the user, the mobile radio telephone apparatus is capable of using a single 7, 8 segment display in place of a more complicated and expensive multielement LCD display, without sacrificing any of the features of such a mobile radio telephone apparatus which users have come to expect in such apparatus.

The invention having been thus described, it will be apparent to those skilled in the art that the same may be varied in many ways without departing from the spirit and scope of the invention. Any and all such modifications are intended to be included within the scope of the following claims.

What is claimed is:

1. A display for a mobile radio telephone apparatus, comprising:

a single 7, 8 segment LED display having seven segments for representation of alphanumeric characters through selective activation of various combinations of said seven segments, and an eighth segment for representation of an operational parameter of said apparatus;

means for designating predetermined ones of said seven segments for representation of other operational parameters of said apparatus; and means for controlling selective activation of said 7, 8 segment LED display in response to signals from circuitry of said apparatus so as to selectively represent alphanumeric characters and operational parameters of said apparatus.

2. A display for a mobile radio telephone apparatus according to claim 1, wherein one of said seven segments designates an in use operational parameter indicating whether a call is in progress.

3. A display for a mobile radio telephone apparatus according to claim 1, wherein one of said seven segments designates a roam operational parameter indicating whether said apparatus is operating on a preferred system.

4. A display for a mobile radio telephone apparatus according to claim 1, wherein one of said seven segments designates a no service operational parameter indicating whether said apparatus is outside of an available service area.

5. A display for a mobile radio telephone apparatus according to claim 1, wherein said eighth segment designates that a digit being displayed by said seven segments indicates a received signal strength of a signal received by said apparatus.

6. A display for a mobile radio telephone apparatus according to claim 5, wherein said eighth segment also designates a low battery level of said apparatus.

7. A mobile radio telephone apparatus, comprising:

a telephone body;

a keypad provided on said body containing a plurality of keys for generating signals for operating said apparatus;

transceiver circuitry housed in said body for sending and receiving communication signals;

an LED display containing a plurality of segments of a first type, the totality of said segments being capable of representing only a single alphanumeric character at one time, and predetermined ones of said plurality of segments representing certain operational parameters of said apparatus; and a controller for selectively controlling activation of said segments of said LED display in response to signals from said keypad and signals from said transceiver circuitry so as to selectively display either an alphanumeric character or an operational parameter.

8. A mobile radio telephone apparatus according to claim 7, wherein one of said predetermined ones of said segments designates an in use operational parameter indicating whether a call is in progress.

9. A mobile radio telephone apparatus according to claim 7, wherein one of said predetermined ones of said segments designates a roam operational parameter indicating whether apparatus is operating on a preferred system.

10. A mobile radio telephone apparatus according to claim 7, wherein one of said predetermined ones of said segments designates a no service operational parameter indicating whether said apparatus is outside of an available service area.

11. A mobile radio telephone apparatus according to claim 7, wherein said LED display further contains a segment of a second type, wherein said second type segment designates that a digit being displayed by said first type segments indicates a received signal strength of a signal received by said apparatus.

12. A display for a mobile radio telephone apparatus according to claim 11, wherein said second type segment also designates a low battery level of said apparatus.

13. A method for displaying information on a mobile radio telephone apparatus, comprising the steps of:

provide a single LED display for said telephone apparatus having seven segments for representing a single alphanumeric character;

designating predetermined ones of said seven segments of said LED display as indicating specific operational parameters of said telephone apparatus;

displaying individual alphanumeric characters on said display by activation of various predetermined combinations of said seven segments in a first mode of operation of said apparatus; and activating particular ones of said predetermined ones of said seven segments in a second mode of operation to indicate the status of said operational parameters.

14. A method according to claim 13, wherein one of said seven segments designates an in use operational parameter indicating whether a call is in progress.

15. A method according to claim 13, wherein one of said seven segments designates a roam operational parameter indicating whether said apparatus is operating on a preferred system.

16. A method according to claim 13, wherein one of said seven segments designates a no service operational parameter indicating whether said apparatus is outside of an available service area.

17. A method according to claim 13, further comprising the step of providing an eighth segment on said LED display, and wherein said eighth segment designates that a digit being displayed by said seven segments indicates a received signal strength of a signal received by said apparatus.

18. A method according to claim 17, wherein said eighth segment also designates a low battery level of said apparatus.

* * * * *